United States Patent
Ponnusamy et al.

(10) Patent No.: US 12,209,667 B2
(45) Date of Patent: Jan. 28, 2025

(54) HYDRAULIC CYLINDER SEALING ARRANGEMENT

(71) Applicant: CATERPILLAR INC., Peoria, IL (US)

(72) Inventors: Ananda Sudhakar Ponnusamy, Naperville, IL (US); Rameshkrishnan Lakshminarayanan, Chennai (IN); Justin Douglas Speichinger, Morton, IL (US); Cody Patrick Renshaw, Washington, IL (US); Jaime E. Ruiz, Queensland (AU)

(73) Assignee: CATERPILLAR INC., Peoria, IL (US)

( * ) Notice: Subject to any disclaimer, the term of this patent is extended or adjusted under 35 U.S.C. 154(b) by 120 days.

(21) Appl. No.: 17/740,569

(22) Filed: May 10, 2022

(65) Prior Publication Data
US 2023/0366466 A1    Nov. 16, 2023

(51) Int. Cl.
*F16J 15/32* (2016.01)
*F15B 15/14* (2006.01)
(Continued)

(52) U.S. Cl.
CPC ....... *F16J 15/3232* (2013.01); *F15B 15/1452* (2013.01); *F16J 15/166* (2013.01)

(58) Field of Classification Search
CPC .. F16J 15/3232; F16J 15/3236; F16J 15/3268; F16J 15/166
See application file for complete search history.

(56) References Cited

U.S. PATENT DOCUMENTS 3,567,258 A * 3/1971 Scaramucci ........... F16J 15/025
                                                        285/334.4
3,765,690 A * 10/1973 Sievenpiper ............. F16J 15/56
                                                        277/584
(Continued)

FOREIGN PATENT DOCUMENTS

| CL | 202203061 | 5/2022 |
|---|---|---|
| CL | 202203117 | 5/2022 |

(Continued)

OTHER PUBLICATIONS

Written Opinion and International Search Report for Int'l. Patent Appln. No. PCT/US2023/019523, mailed Jul. 4, 2023 (19 pgs).
(Continued)

*Primary Examiner* — Eugene G Byrd
*Assistant Examiner* — L. Susmitha Koneru
(74) *Attorney, Agent, or Firm* — Xsensus, LLP (57) ABSTRACT

A combination of seals and wear guides for use in a hydraulic cylinder provides a sealed engagement between a piston rod of the hydraulic cylinder and an inner circumferential surface of a rod end of a cylinder barrel of the hydraulic cylinder through which the piston rod is axially movable. The combination includes a cylindrical metallic wear guide for seating within a first annular groove formed around the inner circumferential surface, a buffer seal assembly including an annular buffer seal cooperatively mated with an annular backup ring for seating within a second annular groove, a U-cup seal for seating within a third annular groove, a cylindrical plastic wear guide for seating within a fourth annular groove, and a triple lip wiper seal including three ringed lip portions for seating within a fifth annular groove.

20 Claims, 4 Drawing Sheets

(51) Int. Cl.
  *F16J 15/16* (2006.01)
  *F16J 15/3232* (2016.01)

(56) References Cited

U.S. PATENT DOCUMENTS

| | | | | |
|---|---|---|---|---|
| 4,231,578 | A * | 11/1980 | Traub | F16F 9/363 |
| | | | | 277/572 |
| 4,268,045 | A * | 5/1981 | Traub | F16J 15/166 |
| | | | | 277/589 |
| 5,303,935 | A * | 4/1994 | Saksun | F16J 15/3268 |
| | | | | 277/944 |
| 6,113,108 | A * | 9/2000 | Friend | F16J 15/164 |
| | | | | 277/560 |
| 6,129,358 | A | 10/2000 | Kiesel et al. | |
| 6,454,273 | B1 * | 9/2002 | Kashima | F16J 15/166 |
| | | | | 277/928 |
| 6,712,362 | B2 * | 3/2004 | Krappmann | F16D 25/08 |
| | | | | 277/560 |
| 6,979,002 | B2 | 12/2005 | Ramsay | |
| 7,392,736 | B2 | 7/2008 | Fenn | |
| 9,512,924 | B2 | 12/2016 | Uesugi et al. | |
| 10,415,608 | B2 | 9/2019 | Van Gemert | |
| 2002/0153665 | A1 * | 10/2002 | Borstel | F16J 15/164 |
| | | | | 277/560 |
| 2004/0119241 | A1 * | 6/2004 | Castleman | F16J 15/3232 |
| | | | | 277/436 |
| 2007/0205561 | A1 * | 9/2007 | Emoto | F16J 15/166 |
| | | | | 277/500 |
| 2007/0216111 | A1 * | 9/2007 | Matsui | F16J 15/3232 |
| | | | | 277/647 |
| 2008/0007012 | A1 * | 1/2008 | Jeong | F16J 15/3236 |
| | | | | 277/510 |
| 2009/0084257 | A1 | 4/2009 | Buckley | |
| 2010/0237565 | A1 * | 9/2010 | Foster | F16J 15/3236 |
| | | | | 277/377 |
| 2010/0295253 | A1 * | 11/2010 | Tadano | F16J 15/164 |
| | | | | 277/549 |
| 2011/0169226 | A1 * | 7/2011 | Ajiki | F16J 15/3232 |
| | | | | 277/562 |
| 2016/0348461 | A1 * | 12/2016 | Ito | F16J 15/166 |
| 2019/0309773 | A1 * | 10/2019 | Sybrandy | F15B 15/1461 |

FOREIGN PATENT DOCUMENTS

| | | | |
|---|---|---|---|
| CN | 104964037 A | 10/2015 | |
| CN | 211525542 U | 9/2020 | |
| CN | 215172226 U | 12/2021 | |
| CN | 216278759 U | 4/2022 | |
| EM | 0010054330002 | 11/2008 | |
| EM | 0070757420008 | 10/2019 | |
| EP | 0502409 | 9/1992 | |
| EP | 1762757 A1 * | 3/2007 | F16J 15/164 |
| GB | 2219050 | 11/1989 | |
| JP | 2006132660 A | 5/2006 | |
| JP | 2009174555 A | 8/2009 | |
| JP | D1404886 | 1/2011 | |
| JP | D1498368 | 5/2014 | |
| KR | 20180071770 A | 6/2018 | |
| PH | 32022051061 | 2/2023 | |
| WO | 2014108122 A1 | 7/2014 | |

OTHER PUBLICATIONS

D1+Mobile Hydraulic Sep. 26, 2012, https://www.mobilehydraulictips.com/what-are-hydraulic-cylinders/.

Hydraulic Cylinder, Plant Maintenance Nov. 16, 2018 https://cjplantmaintenance.com/what-are-the-parts-of-a-hydraulic-cylinder/.

Hystat. Dec. 2008. http://www.comarfluidpower.com/images/uploaded/products/product-branded-pdf-56e72bd930a59-88.pdf.

JAES Company May 29, 2020 https://www.youtube.com/watch?app=desktop&v=UVzWGkF9-28.

Rexroth, Hydraulic Cylinder Mill Type. RE 17332 Edition: Jul. 2021. p. 1; https://pdf.directindustry.es/pdf-en/bosch-rexroth-industrial-hydraulics/hydraulic-cylindersmill-type-series-cdh1-cgh1-csh1/0143-931362.html.

Chilean 2nd Substantive Report for Chile Patent Application No. 2022-03116, mailed Mar. 25, 2024, total 18 pages.

* cited by examiner

HYDRAULIC CYLINDER SEALING ARRANGEMENT

TECHNICAL FIELD

The present disclosure is directed to a sealing arrangement for a hydraulic cylinder. In particular, the present disclosure is directed to a sealing arrangement that engages a piston rod slidably supported to move axially within a hydraulic cylinder head.

BACKGROUND

Many work machines, such as tractors, excavators, loaders, and other earth moving equipment, utilize hydraulic actuators to generate the force and relative movement of various portions of the machines required to accomplish their tasks. These hydraulic actuators, which include, for example, hydraulic cylinders and fluid motors, typically include two fluid chambers disposed on opposite sides of a moveable element. Pressurized fluid is introduced into one of the fluid chambers, which causes the moveable element to move relative to the hydraulic actuator housing.

The moveable element is usually connected to a work implement or other machine component on the work machine through a rod or shaft. Typically, each hydraulic actuator includes a sealing arrangement that engages the rod or shaft to prevent the pressurized fluid from leaking from the fluid chambers of the hydraulic actuator during use. One such sealing arrangement for a hydraulic cylinder is described in U.S. Pat. No. 6,129,358, which describes a unidirectional rod sealing ring adapted to form a sealed condition.

A sealing arrangement for a hydraulic cylinder may include a series of seals that are disposed in a cylinder head or a flange at a rod end of a cylinder barrel to engage the shaft or piston rod proximate an exit point of the piston rod. The cylinder head and/or flange at the rod end of the cylinder barrel may include a series of annular grooves, or counter bores, axially spaced along a radially inner circumferential surface of the rod end of the cylinder barrel, with the annular grooves being configured to receive each of the seals.

The annular grooves in the cylinder head, which are adapted to receive the various seals, may get damaged when the hydraulic cylinder is being used in an aggressive application, such as a hydraulic cylinder used as a boom, stick, or bucket cylinder on a machine such as an excavator, track type tractor, or large wheel loader working in an application such as mining coal, bauxite, iron ore, or other minerals. Other applications of heavy machinery in earth moving operations may also expose hydraulic cylinders used on the heavy machinery for moving various components of the machinery relative to each other and relative to a work surface, to abrasive materials that may penetrate past one or more of an array of seals positioned between a piston rod and a cylinder head of the hydraulic cylinder. The array of seals may be designed to prevent leakage of pressurized hydraulic fluid within the hydraulic cylinder outward between the piston rod and the head of the hydraulic cylinder, as well as prevent contamination of materials from outside the hydraulic cylinder into the piston rod side chamber (also referred to as the "rod end" chamber, or "head end" chamber) at the side of the hydraulic cylinder where the piston rod comes out of the cylinder. In some applications, contaminants may collect between a sealing surface of a seal and the surface of the annular groove in the cylinder head and/or flange at the rod end of the cylinder barrel adapted to receive the seal. These contaminants may become imbedded into the face of the seal that engages with a face of the annular groove in the cylinder head and/or flange, and relative movement between the seal with embedded abrasive contaminants and the annular groove over time during operation of the hydraulic cylinder may result in grinding away a portion of the annular groove (typically formed in a metallic material of the cylinder head and/or flange at the rod end of the cylinder barrel) to create an unwanted step or gap adjacent the seal, which may ultimately cause failure of the seal and a leak from the hydraulic cylinder.

The various disclosed exemplary embodiments of seal assemblies, and arrangements of seals and wear guides for use in a hydraulic cylinder to provide a sealed engagement between a piston rod of the hydraulic cylinder and a cylinder head and/or flange at the rod end of the cylinder barrel of the hydraulic cylinder, are directed to solving all or some of the problems set forth above.

SUMMARY

In one aspect, the present disclosure is directed to a combination of seals and wear guides for use in a hydraulic cylinder to provide a sealed engagement between a piston rod of the hydraulic cylinder and a rod end of a barrel of the hydraulic cylinder through which the piston rod is axially movable. The combination includes a cylindrical metallic wear guide configured to be seated within a first annular groove formed around an inner circumferential surface of the rod end of the cylinder barrel, a buffer seal assembly including an annular buffer seal cooperatively mated with an annular backup ring and configured to be cooperatively seated within a second annular groove axially spaced from the first annular groove and formed around an inner circumferential surface of the rod end of the cylinder barrel, a U-cup seal configured to be seated within a third annular groove axially spaced from the second annular groove and formed around an inner circumferential surface of the rod end of the cylinder barrel, a cylindrical plastic wear guide configured to be seated within a fourth annular groove axially spaced from the third annular groove and formed around an inner circumferential surface of the rod end of the cylinder barrel, and a triple lip wiper seal including three ringed lip portions configured to be seated within a fifth annular groove axially spaced from the fourth annular groove and formed around an inner circumferential surface of the rod end of the cylinder barrel.

In another aspect, the present disclosure is directed to a hydraulic cylinder including a combination of seals and wear guides axially spaced along an inner circumferential surface of a rod end of a cylinder barrel of the hydraulic cylinder and configured to provide a sealed engagement between a piston rod of the hydraulic cylinder and the rod end of the cylinder barrel of the hydraulic cylinder through which the piston rod is axially movable. The combination of seals and wear guides includes a cylindrical metallic wear guide configured to be seated within a first annular groove formed around an inner circumferential surface of the rod end of the cylinder barrel, a buffer seal assembly including an annular buffer seal cooperatively mated with an annular backup ring and configured to be cooperatively seated within a second annular groove axially spaced from the first annular groove and formed around an inner circumferential surface of the rod end of the cylinder barrel, a U-cup seal configured to be seated within a third annular groove axially spaced from the second annular groove and formed around an inner circumferential surface of the rod end of the cylinder barrel, a cylindrical plastic wear guide configured to be seated within a fourth annular groove axially spaced from the third annular groove and formed around an inner circumferential surface of the rod end of the cylinder barrel, and a triple lip wiper seal including three ringed lip portions configured to be seated within a fifth annular groove axially spaced from the fourth annular groove and formed around an inner circumferential surface of the rod end of the cylinder barrel. The annular buffer seal includes a first axial pressure side configured to face a rod end chamber of the hydraulic cylinder and fit adjacent a first axial side surface of the second annular groove, and a second axial seal side opposite from the first axial pressure side, the second axial seal side including a radially outer annular seal surface and a radially inner annular seal surface, wherein the radially outer annular seal surface is spaced farther from the first axial pressure side of the annular buffer seal than the radially inner annular seal surface of the buffer seal such that an annular notch is formed around an inner diameter of the annular buffer seal on the second axial seal side of the annular buffer seal. The annular backup ring includes a radially extending leg portion configured to extend along substantially an entire radial extent of the radially outer annular seal surface of the annular buffer seal, and an axially extending leg portion contiguous with the radially extending leg portion, and configured to extend axially into the annular notch formed around the inner diameter of the annular buffer seal on the second axial seal side of the annular buffer seal.

In yet another aspect, the present disclosure is directed to a hydraulic cylinder that includes a barrel, a cylinder head and flange at a rod end of the barrel, and a piston rod extending through the rod end of the cylinder barrel and configured for axial movement relative to the cylinder barrel. The rod end of the cylinder barrel includes a plurality of axially spaced annular grooves formed around an inner circumferential surface of the rod end of the cylinder barrel, each of the axially spaced annular grooves being configured for supporting a seal member configured for sealing engagement with the piston rod. The plurality of axially spaced annular grooves includes a first annular groove configured to support a cylindrical metallic wear guide, a second annular groove axially spaced from the first annular groove and configured to support a buffer seal assembly including an annular buffer seal cooperatively mated with an annular backup ring, a third annular groove axially spaced from the second annular groove and configured to support a U-cup seal, a fourth annular groove axially spaced from the third annular groove and configured to support a cylindrical plastic wear guide, and a fifth annular groove axially spaced from the fourth annular groove and configured to support a triple lip wiper seal including three ringed lip portions.

DETAILED DESCRIPTION

Figure 1:
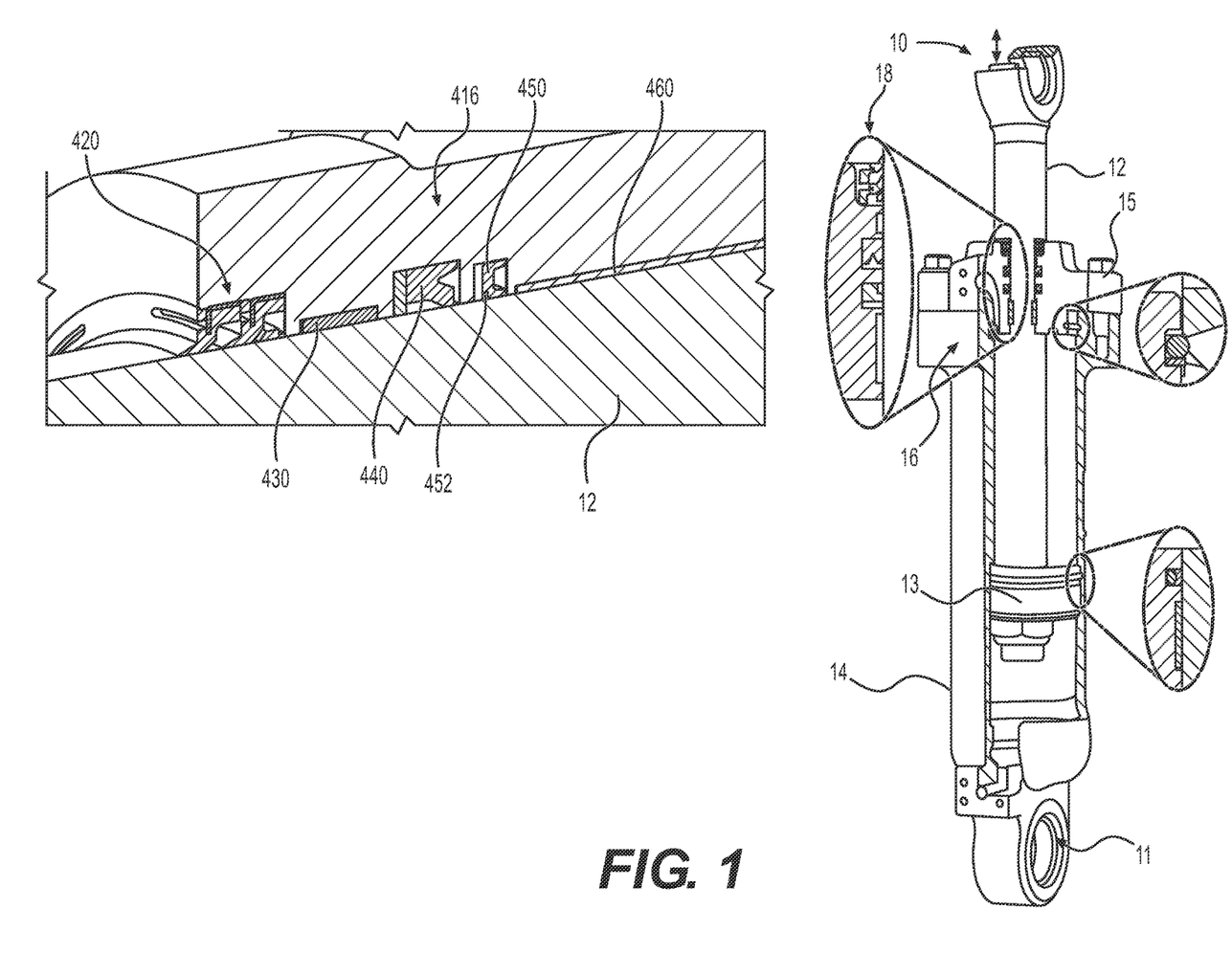
FIG. 1 is a partially cut-away, perspective view of a hydraulic cylinder including an array of seals between a piston rod and a cylinder head and/or flange at a rod end of a cylinder barrel of the hydraulic cylinder according to an embodiment of the present disclosure.

Referring to the drawings, FIG. 1 shows an exemplary hydraulic cylinder 10 with a piston rod 12 attached at one axial end to a piston 13 that is slidably disposed within a cylinder barrel 14. The piston rod 12 is axially movable through a cylinder head bolted to a flange at a rod end 16 of the cylinder barrel 14 by a plurality of bolts 15. The rod end 16 of the cylinder barrel 14 is at an opposite axial end of the cylinder barrel 14 from a blind or closed cap end 11 of the cylinder barrel 14. As shown in more detail in FIGS. 2-4, the piston rod 12 is slidably engaged along a circumferential outer periphery of the piston rod 12 with an array 18, 318, 418 of annular piston rod seals and wear guides axially spaced along a radially inner circumferential surface of the cylinder head and/or flange at the rod end 16, 316, 416 of the cylinder barrel 14. In various exemplary embodiments, the array of annular piston rod seals and wear guides may be disposed in axially spaced annular grooves formed around the radially inner circumferential surface of one or both of the cylinder head and the flange at the rod end 16, 315, 416 of the cylinder barrel 14. Reference to a radially inner circumferential surface of a rod end of the cylinder barrel throughout this specification means a radially inner circumferential surface of a flange at the rod end of the cylinder barrel and a radially inner circumferential surface of a cylinder head bolted to the flange at the rod end of the cylinder barrel.

Figure 2:
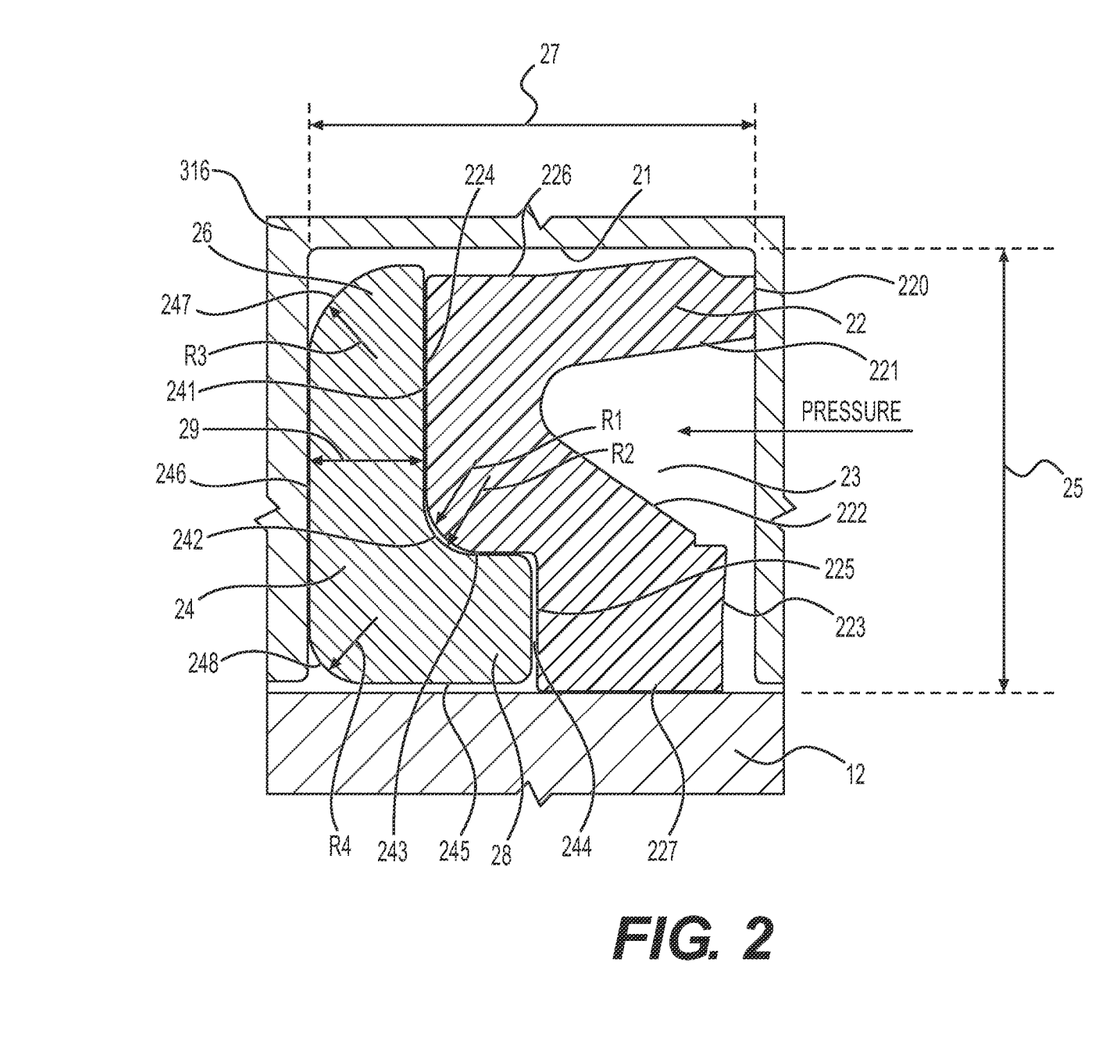
FIG. 2 is a radial, cross-sectional view of one section of an annular buffer seal assembly that may be used for sealing between a piston rod and a rod end of a cylinder barrel according to an embodiment of the present disclosure.
Figure 3:
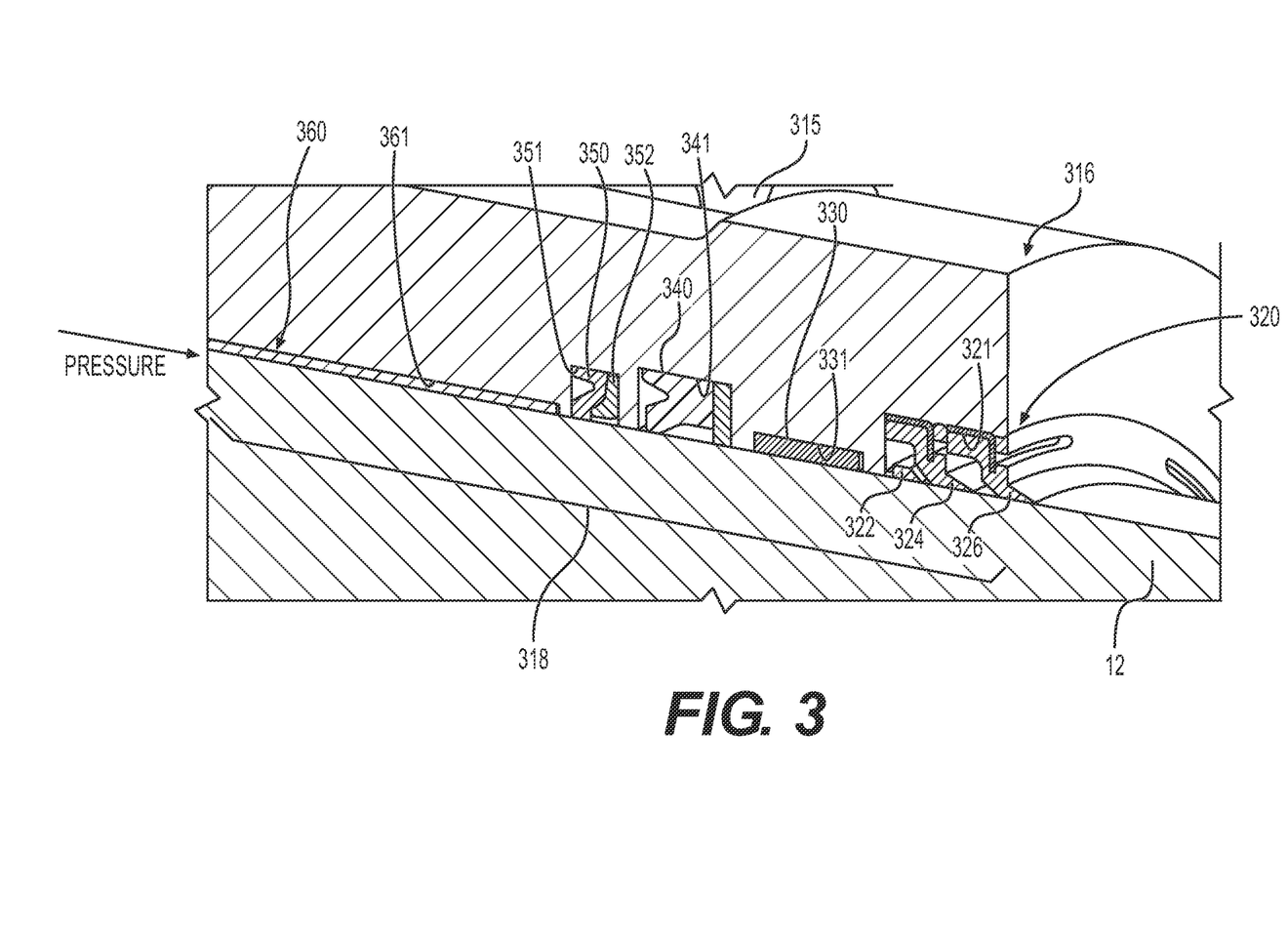
FIG. 3 is a partial, cross-sectional view of a sealing arrangement for a hydraulic cylinder piston rod and cylinder head and/or flange at a rod end of a cylinder barrel according to an embodiment of the present disclosure, including the buffer seal assembly shown in FIG. 2.

The annular piston rod seal closest to the pressurized rod end chamber of the hydraulic cylinder 10 may be a buffer seal assembly that includes an annular buffer seal 22, 350, and an annular backup ring 24, 352, as shown in FIGS. 2 and 3. The buffer seal 22, 350 and backup ring 24, 352 may be installed in operative position at the rod end of the hydraulic cylinder 12, in an annular groove 21, 351 extending around a radially inner circumferential surface of the rod end 16, 316, for slidable engagement with the piston rod 12 movable axially therein. The annular groove 21, 351 may have a width 27 and a depth 25. The hydraulic cylinder 12 is exemplary of hydraulic cylinders utilized for a wide variety of purposes in association with tractors, earth moving equipment, and the like. Some exemplary applications of hydraulic cylinders that include a buffer seal assembly according to embodiments of this disclosure may include hydraulic cylinders used for performing one or more operations such as extending, retracting, lifting, tilting, rotating, and performing other movements of various components on heavy machinery, such as a boom, a stick, and a bucket of an excavator, or other components of machines such as large wheel loaders, hydraulic mining shovels, large track type tractors, and other equipment.

As shown in the exemplary embodiment of FIG. 2, the buffer seal 22 may be an annular, elastomeric ring, formed from an elastomeric material such as polyurethane or rubber, and configured to fit within an annular groove 21 formed around the radially inner circumferential surface of the cylinder head 316. The annular buffer seal 22 may include a first axial pressure side formed with a plurality of contiguous, axially facing pressure surfaces 220, 221, 222, and 223, which face toward the pressurized rod end chamber of the hydraulic cylinder 12, and a second, opposite axial seal side formed with a plurality of contiguous, axially facing seal surfaces 224, 225, which face toward the outside of the hydraulic cylinder and are configured to contact the backup ring 24, 352 in mating, cooperative relationship within the annular groove 21. The first axial pressure side of the annular buffer seal 22 includes the radially outer annular pressure surface 220 joined to the radially inner annular pressure surface 223 by two contiguous and converging tapered pressure surfaces 221, 222 that together define an annular, concave recess 23 in the first axial pressure side of the buffer seal. The buffer seal also includes a radially outer circumferential surface 226 configured to contact the bottom of the annular groove 21, 351, or rest adjacent the bottom of the annular groove, 21, 351, and a radially inner circumferential surface 227 configured to contact the piston rod 12 that is movable axially within the rod end 16, 316.

The pressure surfaces 221, 222 may be axially tapered, linear or curved surfaces that converge together to define the annular, concave recess 23 in the first axial pressure side of the annular buffer seal 22, with the recess 23 separating a radially outer annular leg portion having the pressure surface 221 and terminating at the axially facing annular pressure surface 220, and a radially inner annular leg portion having the pressure surface 222 and terminating at the axially facing annular pressure surface 223. Pressure applied into the annular recess 23 may cause the radially outer annular leg portion to flex radially outward and press against the bottom surface of annular groove 21, and cause the radially inner annular leg portion to flex radially inward and press against the piston rod 12. The radially outer circumferential surface 226 of the buffer seal 22 may be configured with portions along its axial length that sit adjacent or in contact with the bottom of the annular groove 21, with a small gap left between some of the portions of the radially outer circumferential surface 226 and the bottom of the annular groove 21, in some instances, when the pressure applied into the annular recess 23 falls below a certain threshold. Similarly, in various embodiments of the annular buffer seal 22 according to this disclosure, the radially inner circumferential surface 227 of the buffer seal 22 may be configured with portions along its axial length, or its entire axial length coming into contact with the radially outer circumferential surface of the piston rod 12. Portions of one or both of the radially outer circumferential surface 226 and the radially inner circumferential surface 227 of the buffer seal 22 may remain spaced from the bottom of the annular groove 21 and the piston rod 12, respectively, as the piston rod 12 moves axially to extend and retract relative to the cylinder head and/or flange at the rod end 316 of the cylinder barrel of the hydraulic cylinder 10, in some instances, depending on the amount of pressure applied into the annular recess 23 from the pressurized rod end chamber of the hydraulic cylinder 10. Higher pressures above a certain predetermined threshold, which may be introduced into the annular recess 23 from the rod end chamber of the hydraulic cylinder 10, may cause flexure of one or both of the radially outer annular leg portion having the pressure surface 221 and the radially inner annular leg portion having the pressure surface 222, thus creating a tighter seal between one or more portions of the annular buffer seal 22 and the annular groove 21 and/or the piston rod 12.

As shown in FIG. 2, the buffer seal 22 may be cooperatively mated along the axially facing seal surfaces 224, 225 with the backup ring 24, and the assembly of the buffer seal 22 and the backup ring 24 is cooperatively receivable in the annular groove 21 formed in the radially inner circumferential surface of the rod end 16, 316, 416 of hydraulic cylinder 12. The axially facing annular seal surface 224 of the buffer seal 22 may be disposed at a greater distance from the first axial pressure side of the annular buffer seal 22 than the axially facing annular seal surface 225 of the buffer seal 22 such that an annular step or notch is formed around the inner diameter of the annular buffer seal 22 on the axial seal side of the annular buffer seal 22 where the axially facing seal surface 224 joins with the axially facing seal surface 225. The axially facing seal surface 224 may be formed with a convex radius R1 at the entrance to the notch, with the convex radius R1 being predetermined to avoid creating a higher stress area at the entrance to the notch.

The backup ring 24 may be formed with a radially extending leg portion 26, configured to extend along substantially the entire radial extent of the axially facing seal surface 224 of the buffer seal 22. The radially extending leg portion 26 may terminate in a chamfered outer circumferential surface 247 with a convex radius R3 formed on the radially outer edge of the side of the backup ring facing away from the buffer seal 22. The reference to "substantially the entire radial extent" means at least 50%-75% of the radial extent of the axially facing seal surface 224 of the buffer seal 22. The increased surface area of the backup ring 24 in contact with the radially outermost seal surface 224 of the buffer seal 22, as compared with conventional arrangements, reduces contact forces at any point along the interface between the backup ring 24 and the buffer seal 22, thus reducing any wear created by abrasive elements introduced in between the two components, as well as assisting in the assembly of the backup ring with the buffer seal 22 in the proper orientation. The backup ring 24 may be formed with an axially extending leg portion 28, contiguous with the radially extending leg portion 26, and configured to extend axially into the annular notch formed at the intersection of the axially facing seal surfaces 224, 225 of the buffer seal 22. The axially extending leg portion 28 of the backup ring 24 may be configured to mate with the annular notch of the buffer seal 22 along a radially outer surface 243, an axial end surface 244, and a radially inner surface 245, with the radially inner surface 245 of the axially extending leg portion 28 being configured to contact or sit at a small spacing from the outer circumferential surface of the piston rod 12 passing through the buffer seal assembly. In some exemplary embodiments of this disclosure, the radially extending leg portion 26 may have a portion with a thickness 29, in a direction substantially parallel to the piston rod 12, that falls within a range from approximately 1 mm to approximately 4 mm. The surfaces 241, 243 at the intersection of the radially extending leg portion 26 and the axially extending leg portion 28 of the backup ring 24 may be formed with a concave radius R2 that mates with the convex radius R1 at the entrance to the annular notch formed around the inner diameter of the annular buffer seal 22 on the axial seal side of the annular buffer seal 22. The opposite surfaces 246, 245 at the intersection of the radially extending leg portion 26 and the axially extending leg portion 28 may be formed with a convex radius R4, which also avoids the creation of any higher stress areas that may otherwise be created if the backup ring 24 was formed with sharp corners or circumferential edges. In some exemplary embodiments, each of the radii R1, R2, R3, and R4 may be a predetermined value based on one or more of the types of material being used for the buffer seal 22 and the backup ring 24, the fluid pressures that will be exerted against one or both of the buffer seal 22 and the backup ring 24, the overall dimensions of the buffer seal 22 and the backup ring 24, and other factors that may affect the hoop stresses and other stresses experienced by the parts under different operating conditions. As one, non-limiting example, each of the radii R1, R2, R3, and R4 may be predetermined to have a value that is greater than or equal to one half of the thickness of the respective part in the area where the respective radius is formed.

Alternative embodiments of this disclosure may include a buffer seal 22 with a shallower notch formed around the inner diameter of the buffer seal than shown in the exemplary embodiment of FIG. 2, or another interconnecting configuration between the buffer seal and the backup ring. For example, rather than a notch with a relatively sharp corner at the bottom of the notch, as shown in FIG. 2, alternative interconnecting configurations between the buffer seal and the backup ring may include axially tapering or curved surfaces on the axial seal side of the buffer seal and on the mating surfaces of the backup ring.

In some exemplary embodiments, the backup ring 24 may be made of a material that is both stiffer and stronger than the material used for the buffer seal 22. Examples of materials suitable for use for the backup ring 24 may include polytetrafluoroethylene (PTFE), Acetal (POM), Nylon, and other rigid plastic materials, composites, or matrixes. The buffer seal 22 may be formed from materials such as polyurethane, rubber, or other elastomers.

Under no-to-low load or pressure conditions, a clearance may exist between at least a portion of the radially inner surface 245 of the axially extending leg portion 28 of backup ring 24 and the outer peripheral surface of the piston rod 12. This clearance may provide an area or distance for some displacement of the backup ring 24 during higher pressure applications. This displacement area may also provide for an absorption of energy created by hoop stresses in the backup ring 24, and reduce the overall contact forces and frictional forces between the backup ring 24 and the buffer seal 22. In the exemplary embodiment shown in FIG. 2, the backup ring 24 is configured with the axially extending leg portion 28 engaged in the annular notch formed at the intersection of the axially facing seal surfaces 224, 225 of the buffer seal 22, and with the radially extending leg portion 26 extending along substantially the entire radial extent of the axially facing seal surface 224 of the buffer seal 22 such that the backup ring 24 provides optimal extrusion resistance for the buffer seal 22. The cooperative mating relationship between the backup ring 24 and the buffer seal 22 also maintains the optimal stress profile in the area of the backup ring 24 by essentially limiting deformation of the buffer seal 22 relative to the backup ring 24. The backup ring 24, which is made of a stronger material relative to the buffer seal 22, enables accommodation of a greater amount of the force associated with increased pressure on the buffer seal assembly than would be possible with no backup ring, or with a backup ring that does not extend along substantially the entire radial extent of the axially facing seal surface 224 of the buffer seal 22. As discussed above, reference to "substantially the entire radial extent" means 50%-75% or more of the radial extent of the axially facing surface 224 of the buffer seal 22.

Figure 4:
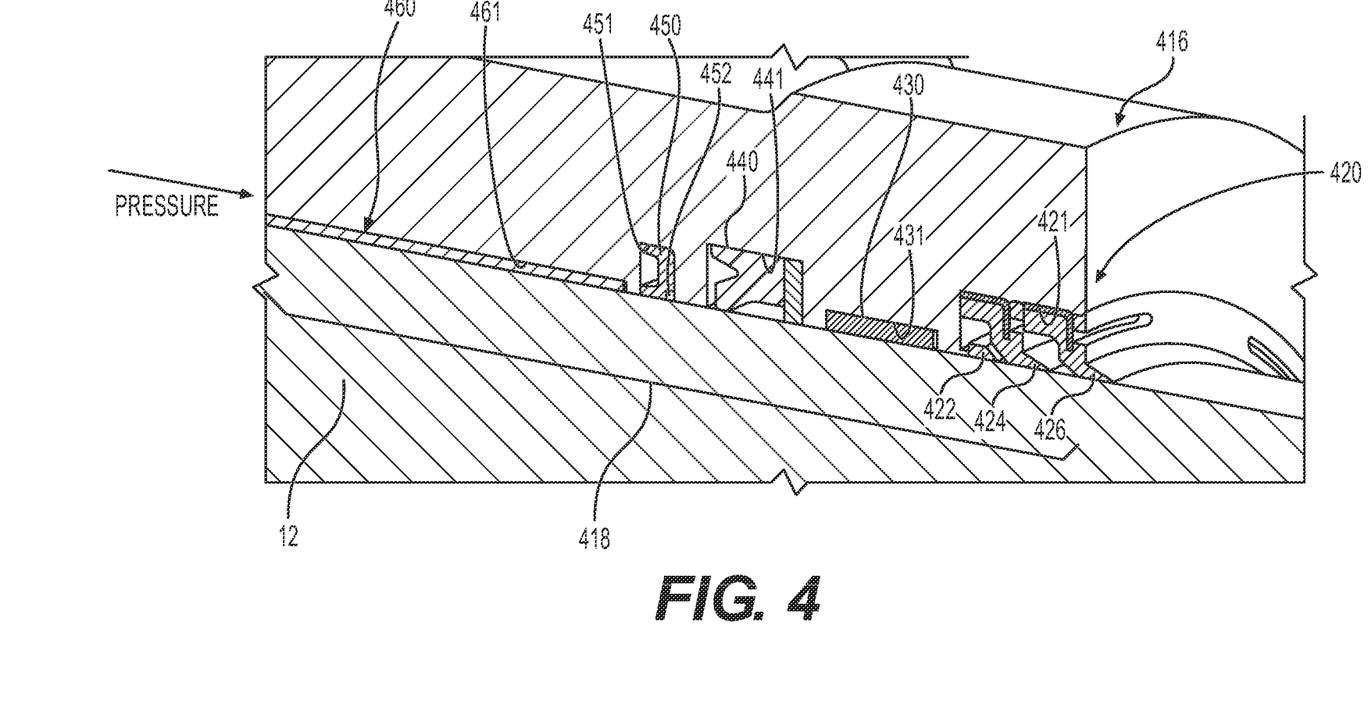
FIG. 4 is a partial, cross-sectional view of a sealing arrangement for a hydraulic cylinder piston rod and cylinder head and/or flange at a rod end of a cylinder barrel according to an embodiment of the present disclosure.

As shown in FIGS. 1, 3, and 4, the buffer seal assembly according to various embodiments of this disclosure may be incorporated as part of an arrangement of piston rod seals axially spaced along an inner circumferential surface of the rod end 16, 316, 416 to form a sealing assembly between the piston rod 12 and the rod end 16, 316, 416. A rod end chamber may be formed between the piston 13 and the rod end 16, 316, 416 within the barrel 14 of the hydraulic cylinder 10. As shown in FIGS. 3 and 4, the rod end 16, 316, 416 according to various embodiments of this disclosure may include, in order from the rod end chamber in the hydraulic cylinder 10 to the axial end surface of the rod end 16, 316, 416 through which the piston rod 12 extends, a cylindrical metallic wear guide 360, 460, seated within an annular groove 361, 461, formed around the inner circumferential surface of the cylinder head and/or flange at the rod end of the cylinder barrel, the buffer seal assembly with a buffer seal 22, 350, 450 and backup ring 24, 352, 452, seated within an annular groove 21, 351, 451, a U-cup seal 340, 440, seated within an annular groove 341, 441, a cylindrical plastic wear guide 330, 430, seated within an annular groove 331, 431, and a triple lip wiper seal 320, 420, including three ringed lip portions 322, 422:324, 424; and 326, 426; seated within an annular groove, or plurality of adjacent annular grooves 321, 421.

Each of the wear guides, the buffer seal assembly, the U-cup seal, and the triple lip wiper seal may engage the outer peripheral surface of the piston rod 12 as it moves axially within the cylinder head and flange at the rod end of the cylinder barrel to extend and retract relative to the hydraulic cylinder. The metallic wear guide 360, 460 and plastic wear guide 330, 430 may assist in maintaining the piston rod in a centered position within the buffer seal assembly, U-cup seal, and wiper seal, in addition to providing an additional sealing interface between the piston rod and the cylinder head. Centering the piston rod within each of the axially spaced seals may improve the sealing capabilities of each of the annular seals by equalizing the contact forces exerted around the entire outer circumferential periphery of the piston rod by each of the annular seals. Each of the wear guides may include one or more annular rings that are disposed in one or more annular grooves formed in the inner circumferential surface of the cylinder head. The buffer seal assembly with the buffer seal 22, 350, 450 and the backup ring 24, 352, 452 is the seal positioned closest to the rod end chamber within the barrel 14. The triple lip wiper seal 320, 420 is the outermost seal. The U-cup seal 340, 440 and plastic wear guide 330, 430 may be disposed between the buffer seal assembly and the wiper seal.

One function of the buffer seal assembly, as the seal axially adjacent the metallic wear guide 360, 460 and the closest of the three sealing rings to the rod end chamber, is to create a high-pressure seal to prevent the escape of fluid from the rod end chamber. It is expected, however, that some fluid may leak through the buffer seal assembly along the outer peripheral surface of the piston rod 12.

The U-cup seal 340, 440 provides a second barrier to prevent fluid from leaking out of the hydraulic cylinder 10. Any fluid that leaks past the buffer seal assembly may be scraped from the outer peripheral surface of the piston rod 12 by the lip of the U-cup seal 340, 440. This fluid may be collected in a recess formed in the U-cup seal 340, 440. When the pressure of the fluid in the rod end chamber decreases to a relatively low level, the pressure of the fluid in the recess formed in the U-cup seal may act on the buffer seal 350, 450 to move the lip of buffer seal 22 (a portion of the surface 227 at the distal end of the radially inner annular leg portion of the buffer seal having the pressure surface 222 in FIG. 2, and terminating at the axially facing annular pressure surface 223) out of engagement with the outer peripheral surface of the piston rod 12. The disengagement of the buffer seal from the outer peripheral surface of the piston rod allows the trapped fluid to return to the rod end chamber of the hydraulic cylinder.

One function of the triple lip wiper seal 320, 420, as the outermost seal, is to prevent dirt and debris from contaminating fluid of the hydraulic cylinder. The wiper seal may be forcibly fit into the annular groove 321, 421. When the triple lip wiper seal 320, 420 is in position within the annular groove 321, 421 in the rod end 316, 416, of the cylinder barrel, the piston rod 12 may be inserted through the central opening in the wiper seal. The central opening through the wiper seal is configured to have a close tolerance with the outer peripheral surface of the piston rod so that each of the lips of the triple lip wiper seal forms a compression-type seal with the outer peripheral surface of the piston rod 12. In other words, the insertion of the piston rod 12 through the opening in the wiper seal causes each of the lips 322, 324, 326 to exert a force on the outer peripheral surface of the piston rod 12, thereby creating a seal. The cutouts adjacent each of the lips of the triple lip wiper seal provide areas into which each body portion of each of the lips may flex when the piston rod 12 passes through the wiper seal. This flexing action of the body portions of each of the wiper seal lips reduces the amount of compression in the individual body portions and, thus, reduces the amount of force exerted on the outer peripheral surface of the piston rod by each of the lips, without significantly reducing the contact area of the lips on the outer peripheral surface of the piston rod 12. In this manner, the wiper seal creates an effective seal with the outer peripheral surface of the piston rod without unduly wearing the surface of the rod when the rod slides within the cylinder housing.

INDUSTRIAL APPLICABILITY

The present disclosure is directed to a buffer seal assembly including an annular buffer seal and mating backup ring, and an entire arrangement of axially spaced annular seals and annular wear guides disposed in annular grooves formed in an inner circumferential surface of a rod end of a cylinder barrel of a hydraulic cylinder. As discussed above, the inner circumferential surface of the rod end of the cylinder barrel may be the inner circumferential surface of the flange and/or the cylinder head at the rod end of the cylinder barrel. The arrangement of axially spaced annular seals and annular wear guides may or may not include the disclosed buffer seal assembly. In an arrangement that includes the buffer seal assembly, the buffer seal 22 may be cooperatively mated with the backup ring 24 and seated within an annular groove formed in an inner circumferential surface of the rod end of a hydraulic cylinder. As discussed above, the annular buffer seal 22 may include a first axial pressure side formed with a plurality of contiguous, axially facing pressure surfaces 220, 221, 222, and 223, which face toward the pressurized rod end chamber of the hydraulic cylinder 10, and a second, opposite axial seal side formed with a plurality of contiguous, axially facing seal surfaces 224, 225, which face toward the outside of the hydraulic cylinder and are configured to contact the backup ring 24 in mating, cooperative relationship within the annular groove 21. The buffer seal 22 also includes a radially outer circumferential surface 226 configured to contact the bottom of the annular groove 21, 351, along portions or the entirety of the outer circumferential surface, and a radially inner circumferential surface 227 configured to contact the piston rod 12 that is movable axially within the rod end 16, along portions or the entirety of the inner circumferential surface.

Two of the pressure surfaces on the axial pressure side of the buffer seal 22 may be axially tapered surfaces that converge together to define an annular, concave recess 23 in the axial pressure side of the annular buffer seal 22, with the recess 23 separating a radially outer annular leg portion and a radially inner annular leg portion, and with a distal end of the radially inner annular leg portion forming a lip configured to seal against an outer circumferential surface of the piston rod 12 as the piston rod extends and retracts relative to the rod end of the cylinder barrel of the hydraulic cylinder. In alternative embodiments of the buffer seal, pressure surfaces on the axial pressure side of the buffer seal 22 may form more than one concave, annular recess along the radial extent of the buffer seal. Pressure from the rod end chamber of the hydraulic cylinder 10 may pass the metallic wear guides 360, 460 and enter the annular recess 23, or more than one recesses defined in the axial pressure side of the buffer seal 22. This pressure may cause a radially outer annular leg portion of the buffer seal 22 to flex radially outward and press against the bottom surface of annular groove 21, and cause a radially inner annular leg portion of the buffer seal 22 to flex radially inward and press against the piston rod 12.

The radially outer circumferential surface 226 of the buffer seal 22 may be configured with portions along its axial length that sit adjacent or in contact with the bottom of the annular groove 21, with a small gap left between some of the portions of the radially outer circumferential surface 226 and the bottom of the annular groove 21 when the pressure applied into the annular recess 23 falls below a certain threshold. Similarly, in various embodiments of the annular buffer seal 22 according to this disclosure, the radially inner circumferential surface 227 of the buffer seal 22 may be configured with portions along its axial length, or its entire axial length coming into contact with the radially outer circumferential surface of the piston rod 12. Portions of one or both of the radially outer circumferential surface 226 and the radially inner circumferential surface 227 of the buffer seal 22 may remain spaced from the bottom of the annular groove 21 and the piston rod 12 as the piston rod 12 moves axially to extend and retract relative to the rod end 316 of the cylinder barrel of the hydraulic cylinder 10, depending on the amount of pressure applied into the annular recess 23 from the pressurized rod end chamber of the hydraulic cylinder 10. Higher pressures above a certain predetermined threshold, which may be introduced into the annular recess 23 from the rod end chamber of the hydraulic cylinder 10, may cause flexure of one or both of the radially outer annular leg portion having the pressure surface 221 and the radially inner annular leg portion having the pressure surface 222, thus creating a tighter seal between one or more portions of the annular buffer seal 22 and the annular groove 21 and/or the piston rod 12.

As shown in FIG. 2, and discussed above, the buffer seal 22 may be cooperatively mated along the axially facing seal surfaces 224, 225 with the backup ring 24, and the assembly of the buffer seal 22 and the backup ring 24 is cooperatively receivable in the annular groove 21 formed in the radially inner circumferential surface of the rod end 16, 316, 416 of hydraulic cylinder 12. The axially facing annular seal surface 224 may be disposed at a greater distance from the first axial pressure side of the annular buffer seal 22 than the axially facing annular seal surface 225 such that an annular notch is formed around the inner diameter of the annular buffer seal 22 on the axial seal side of the annular buffer seal 22 where the axially facing seal surface 224 joins with the axially facing seal surface 225. Alternative embodiments of the buffer seal and mating backup ring may eliminate or change the dimensions or configuration of the annular notch, with the entire radial extent of the axially facing seal side of the buffer seal being substantially coplanar, curved, stepped or notched with one or more annular steps or notches, or otherwise configured. As shown in the exemplary embodiment of FIG. 2, the axially facing seal surface 224 may be formed with a convex radius R1 at the entrance to the notch, with the convex radius R1 being predetermined to avoid creating a higher stress area at the entrance to the notch.

The above disclosed buffer seal assembly and/or entire arrangement of annular seals and wear guides may be incorporated into a sealing assembly of any hydraulic component. Thus, the seals and combinations of seals and wear guides of the present disclosure have wide applications in a variety of machines that include hydraulic actuators and/or hydraulic cylinders. Some of the advantages of the disclosed embodiments include providing a robust piston rod sealing system with multiple barrier contaminant controls, higher resistance to the potentially detrimental effects of temperature, moisture, and pressure in a hydraulic actuator, optimized side loading on the components of a hydraulic cylinder incorporating the disclosed features, fewer machine stoppages for servicing hydraulic cylinders, longer life of the hydraulic cylinder components, including increased piston rod life, and extended oil life for the hydraulic cylinders as a result of avoidance of penetration of contaminants into the hydraulic cylinders or leakage of hydraulic fluid from the hydraulic cylinders.

It will be apparent to those skilled in the art that various modifications and variations can be made in the disclosed individual seals, seal assemblies, and seal arrangements without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A combination of seals and wear guides for use in a hydraulic cylinder to provide a sealed engagement between a piston rod of the hydraulic cylinder and a rod end of a cylinder barrel of the hydraulic cylinder through which the piston rod is axially movable, the combination comprising:
    a cylindrical metallic wear guide configured to be seated within a first annular groove formed around an inner circumferential surface of the rod end of the cylinder barrel;
    a buffer seal assembly including an annular buffer seal cooperatively mated with an annular backup ring and configured to be cooperatively seated within a second annular groove axially spaced from the first annular groove and formed around an inner circumferential surface of the rod end of the cylinder barrel;
    a U-cup seal configured to be seated within a third annular groove axially spaced from the second annular groove and formed around an inner circumferential surface of the rod end of the cylinder barrel;
    a cylindrical plastic wear guide configured to be seated within a fourth annular groove axially spaced from the third annular groove and formed around an inner circumferential surface of the rod end of the cylinder barrel, the cylindrical plastic wear guide being rectangular in a side cross-sectional view of the combination; and
    a triple lip wiper seal including three ringed lip portions configured to be seated within a fifth annular groove axially spaced from the fourth annular groove and formed around an inner circumferential surface of the rod end of the cylinder barrel,
    wherein the cylindrical metallic wear guide has a first length in a longitudinal direction of the piston rod greater than a second length of the cylindrical plastic wear guide in the longitudinal direction, and the cylindrical metallic wear guide having a first thickness less than a second thickness of the cylindrical plastic wear guide.

2. The combination of seals and wear guides of claim 1, wherein the annular buffer seal includes a first axial pressure side configured to face a rod end chamber of the hydraulic cylinder and fit adjacent a first axial side surface of the second annular groove, and a second axial seal side opposite from the first axial pressure side, the second axial seal side including a radially outer annular seal surface and a radially inner annular seal surface,
    wherein the radially outer annular seal surface is spaced farther from the first axial pressure side of the annular buffer seal than the radially inner annular seal surface of the buffer seal such that an annular notch is formed around an inner diameter of the annular buffer seal on the second axial seal side of the annular buffer seal,
    wherein the annular backup ring includes a radially extending leg portion configured to extend along substantially an entire radial extent of the radially outer annular seal surface of the annular buffer seal, and an axially extending leg portion contiguous with the radially extending leg portion, and configured to extend axially into the annular notch formed around the inner diameter of the annular buffer seal on the second axial seal side of the annular buffer seal, and
    wherein the first axial pressure side of the annular buffer seal includes a radially outer annular pressure surface joined to a radially inner annular pressure surface by two contiguous and converging tapered pressure surfaces that together define an annular, concave recess in the first axial pressure side of the buffer seal.

3. The combination of seals and wear guides of claim 1, wherein the buffer seal assembly consists of the annular buffer seal and the annular backup ring,
    wherein the radially extending leg portion of the backup ring terminates in a chamfered outer circumferential surface at a radially outer edge of the side of the backup ring facing away from the buffer seal, and
    wherein the combination of the annular buffer seal and the annular backup ring extends an entire length of the second annular groove.

4. The combination of seals and wear guides of claim 1, wherein the annular buffer seal further includes a radially outer circumferential surface configured to contact a bottom of the annular groove, and a radially inner circumferential surface configured to contact the piston rod,
    wherein the annular buffer seal has a depth less than a depth of the second annular groove, and
    wherein the combination of the annular buffer seal and the annular backup ring extends an entire length of the second annular groove.

5. The combination of seals and wear guides of claim 4, wherein the radially outer circumferential surface of the annular buffer seal is configured with portions along its axial length that sit adjacent or in contact with the bottom of the annular groove, with a small gap left between some of the portions of the radially outer circumferential surface and the bottom of the annular groove when a pressure applied against the first axial pressure side of the buffer seal falls below a predetermined threshold.

6. The combination of seals and wear guides of claim 2, wherein the annular, concave recess is defined between a radially outer annular leg portion of the buffer seal and a radially inner annular leg portion of the buffer seal.

7. The combination of seals and wear guides of claim 6, wherein pressure applied into the annular, concave recess causes the radially outer annular leg portion to flex radially outward and press against a bottom surface of the annular groove, and causes the radially inner annular leg portion to flex radially inward and press against the piston rod.

8. The combination of seals and wear guides of claim 1, wherein the intersection between the radially extending leg portion of the backup ring and the axially extending leg portion of the backup ring includes a radiused chamfer that mates with a matching radiused chamfer at the intersection of the radially outer annular seal surface of the buffer seal and the radially inner annular seal surface of the buffer seal at an entrance into the annular notch.

9. The combination of seals and wear guides of claim 8, wherein the radius of each of the mating radiused chamfers on the backup ring and the buffer seal is equal to one half or more of a thickness of an adjacent portion of the backup ring and the buffer seal, respectively.

10. A hydraulic cylinder, comprising:
a combination of seals and wear guides axially spaced along an inner circumferential surface of a rod end of a cylinder barrel of the hydraulic cylinder and configured to provide a sealed engagement between a piston rod of the hydraulic cylinder and the rod end of the cylinder barrel of the hydraulic cylinder through which the piston rod is axially movable, the combination comprising:
a cylindrical metallic wear guide configured to be seated within a first annular groove formed around an inner circumferential surface of the rod end of the cylinder barrel;
a buffer seal assembly including an annular buffer seal cooperatively mated with an annular backup ring and configured to be cooperatively seated within a second annular groove axially spaced from the first annular groove and formed around an inner circumferential surface of the rod end of the cylinder barrel;
a U-cup seal configured to be seated within a third annular groove axially spaced from the second annular groove and formed around an inner circumferential surface of the rod end of the cylinder barrel;
a cylindrical plastic wear guide configured to be seated within a fourth annular groove axially spaced from the third annular groove and formed around an inner circumferential surface of the rod end of the cylinder barrel, the cylindrical plastic wear guide being rectangular in a side cross-sectional view of the combination; and
a triple lip wiper seal including three ringed lip portions configured to be seated within a fifth annular groove axially spaced from the fourth annular groove and formed around an inner circumferential surface of the rod end of the cylinder barrel;
wherein the cylindrical metallic wear guide has a first length in a longitudinal direction of the piston rod greater than a second length of the cylindrical plastic wear guide in the longitudinal direction, and the cylindrical metallic wear guide having a first thickness less than a second thickness of the cylindrical plastic wear guide.

11. A hydraulic cylinder, comprising:
a barrel;
a cylinder head and flange at a rod end of the barrel; and
a piston rod extending through the rod end of the barrel and configured for axial movement relative to the rod end of the cylinder barrel, wherein the rod end of the cylinder barrel includes a plurality of axially spaced annular grooves formed around an inner circumferential surface of the rod end of the cylinder barrel, each of the axially spaced annular grooves being configured for supporting a seal member configured for sealing engagement with the piston rod, wherein the plurality of axially spaced annular grooves includes:
a first annular groove configured to support a cylindrical metallic wear guide, the first annular groove being rectangular in a side cross-sectional view of the hydraulic cylinder;
a second annular groove axially spaced from the first annular groove and configured to support a buffer seal assembly including an annular buffer seal cooperatively mated with an annular backup ring;
a third annular groove axially spaced from the second annular groove and configured to support a U-cup seal;
a fourth annular groove axially spaced from the third annular groove and configured to support a cylindrical plastic wear guide; and
a fifth annular groove axially spaced from the fourth annular groove and configured to support a triple lip wiper seal including three ringed lip portions,
wherein the first annular groove has a first length in a longitudinal direction of the piston rod greater than a second length of the fourth annular groove in the longitudinal direction, and first annular groove having a first thickness less than a second thickness of the fourth annular groove, and
wherein the hydraulic cylinder is free of any inlet and/or outlet ports the first annular groove to the fifth annular groove.

12. The hydraulic cylinder of claim 11, wherein the second annular groove is sufficiently wide to accommodate the annular backup ring including a radially extending leg portion configured to extend along substantially an entire radial extent of a radially outer annular seal surface of the annular buffer seal.

13. The hydraulic cylinder of claim 10,
wherein the annular buffer seal includes a first axial pressure side configured to face a rod end chamber of the hydraulic cylinder and fit adjacent a first axial side surface of the second annular groove, and a second axial seal side opposite from the first axial pressure side, the second axial seal side including a radially outer annular seal surface and a radially inner annular seal surface,
wherein the radially outer annular seal surface is spaced farther from the first axial pressure side of the annular buffer seal than the radially inner annular seal surface of the buffer seal such that an annular notch is formed around an inner diameter of the annular buffer seal on the second axial seal side of the annular buffer seal,
wherein the annular backup ring includes a radially extending leg portion configured to extend along substantially an entire radial extent of the radially outer annular seal surface of the annular buffer seal, and an axially extending leg portion contiguous with the radially extending leg portion, and configured to extend axially into the annular notch formed around the inner diameter of the annular buffer seal on the second axial seal side of the annular buffer seal, and wherein the first axial pressure side of the annular buffer seal includes a radially outer annular pressure surface joined to a radially inner annular pressure surface by two contiguous and converging tapered pressure surfaces that together define an annular, concave recess in the first axial pressure side of the buffer seal.

14. The hydraulic cylinder of claim 10,
wherein the buffer seal assembly consists of the annular buffer seal and the annular backup ring,
wherein the radially extending leg portion of the backup ring terminates in a chamfered outer circumferential surface at a radially outer edge of the side of the backup ring facing away from the buffer seal, and
wherein the combination of the annular buffer seal and the annular backup ring extends an entire length of the second annular groove.

15. The hydraulic cylinder of claim 10,
wherein the annular buffer seal further includes a radially outer circumferential surface configured to contact a bottom of the annular groove, and a radially inner circumferential surface configured to contact the piston rod,
wherein the annular buffer seal has a depth less than a depth of the second annular groove, and
wherein the combination of the annular buffer seal and the annular backup ring extends an entire length of the second annular groove.

16. The hydraulic cylinder of claim 15, wherein the radially outer circumferential surface of the annular buffer seal is configured with portions along its axial length that sit adjacent or in contact with the bottom of the annular groove, with a small gap left between some of the portions of the radially outer circumferential surface and the bottom of the annular groove when a pressure applied against the first axial pressure side of the buffer seal falls below a predetermined threshold.

17. The hydraulic cylinder of claim 13, wherein the annular, concave recess is defined between a radially outer annular leg portion of the buffer seal and a radially inner annular leg portion of the buffer seal.

18. The hydraulic cylinder of claim 17, wherein pressure applied into the annular, concave recess causes the radially outer annular leg portion to flex radially outward and press against a bottom surface of the annular groove, and causes the radially inner annular leg portion to flex radially inward and press against the piston rod.

19. The hydraulic cylinder of claim 10, wherein the intersection between the radially extending leg portion of the backup ring and the axially extending leg portion of the backup ring includes a radiused chamfer that mates with a matching radiused chamfer at the intersection of the radially outer annular seal surface of the buffer seal and the radially inner annular seal surface of the buffer seal at an entrance into the annular notch.

20. The hydraulic cylinder of claim 19, wherein the radius of each of the mating radiused chamfers on the backup ring and the buffer seal is equal to one half or more of a thickness of an adjacent portion of the backup ring and the buffer seal, respectively.

* * * * *